US009288280B1

(12) United States Patent
McKeon et al.

(10) Patent No.: US 9,288,280 B1
(45) Date of Patent: Mar. 15, 2016

(54) VIRAL FLOW OF THE MEDIA CONTENT ACROSS CLIENT DEVICES

(75) Inventors: Matthew Mehall McKeon, Somerville, MA (US); Sami Mohammed Shalabi, Winchester, MA (US); Cassandra Lynn Doll, Santa Clara, CA (US); Maurice Bennett Shore, Carlisle, MA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 13/312,824

(22) Filed: Dec. 6, 2011

(51) Int. Cl.
*G06F 15/16* (2006.01)
*H04L 29/08* (2006.01)

(52) U.S. Cl.
CPC ............ *H04L 67/2828* (2013.01); *H04L 67/28* (2013.01)

(58) Field of Classification Search
CPC ......... H04L 65/60; H04L 67/02; H04L 51/32; H04L 65/1016; H04L 65/403; H04L 51/18; H04L 12/1859; H04L 51/04
USPC .......................................................... 709/217
See application file for complete search history.

(56) References Cited

U.S. PATENT DOCUMENTS

| 8,694,609 B2 * | 4/2014 | Knittel ................ H04L 67/2847 709/219 |
| 8,887,290 B1 * | 11/2014 | Denton ................... G06F 21/00 726/26 |
| 2006/0053384 A1 * | 3/2006 | La Fetra et al. ............... 715/765 |
| 2006/0168355 A1 * | 7/2006 | Shenfield ................ H04L 67/20 709/250 |
| 2007/0276862 A1 | 11/2007 | Toutonghi |
| 2008/0293450 A1 * | 11/2008 | Ryan et al. .................. 455/556.2 |
| 2010/0146051 A1 * | 6/2010 | Agrawal ............. H04L 67/2828 709/204 |
| 2011/0035262 A1 * | 2/2011 | Meriaz et al. ................ 705/14.1 |
| 2011/0258049 A1 * | 10/2011 | Ramer .............. G06F 17/30867 705/14.66 |

OTHER PUBLICATIONS

"Web crawler," From Wikipedia, the free encyclopedia, http://en.wikipedia.org/wiki/Web_crawler, last modified on Oct. 14, 2011, accessed on Oct. 24, 2011, 13 pages.

* cited by examiner

*Primary Examiner* — Kevin Bates
*Assistant Examiner* — S M Rahman
(74) *Attorney, Agent, or Firm* — Patent Law Works LLP

(57) ABSTRACT

A system, computer-implemented method and computer-readable medium for distributing and accessing media content of a magazine edition are provided. A distributing user selects content to distribute and selects a distribution application. The distribution application generates and transmits to a receiving user a distribution message that includes a link with information about the location of the content and how to display it. The receiving user receives the distribution message and uses the location information to access the content. The content may be accessed in a variety of ways depending on the type of hardware that is used by the receiving user and choices made by the receiving user.

28 Claims, 9 Drawing Sheets

VIRAL FLOW OF THE MEDIA CONTENT ACROSS CLIENT DEVICES

BACKGROUND

1. Technical Field

This description relates to distribution of media content.

2. Background

Users gain access to media content via the Internet or the World Wide Web (or simply the "Web") using websites. In one example, users enter a website address on their mobile devices to access media content. In another example, users may download an application provided by a particular content provider onto their mobile device. The application then presents a user with the media content that is periodically uploaded to the application from a content source provided by the content provider. However, present approaches require users to seek out media that meets their individual needs.

Often, users will realize that content that they access may be of interest to other users. Thus, it is desirable to facilitate the ability of users to share content with other users. By integrating features to support sharing content into an application framework that supports access to media content, the overall value of the application framework is increased.

BRIEF SUMMARY

In one embodiment, a system, computer-implemented method and computer-readable medium for distributing edition content of a magazine edition are provided. A selection of edition content within the magazine edition from a mobile device associated with a distributing user is received. A selection of a distribution application for distributing the selected edition content is received. A distribution message is generated, the distribution message including a link for identifying, at least in part, a location of the selected edition content and information for displaying the selected edition content. Using the selected distribution application, the distribution message is transmitted wherein the distribution message is configured to enable the receiving user to access the selected edition content for display using a computing device.

In another embodiment, a system, computer-implemented method and computer-readable medium for accessing distributed edition content of a magazine edition are provided. An indication is received to activate a link in a distribution message received by a computing device of a receiving user, the link identifying, at least in part, a location of the selected edition content included in a magazine edition that includes the selected edition content on a computing device that generated the distribution message, and a reference to an application for displaying the selected edition content. A type of the computing device used by the receiving user is identified. Based on the type of the computing device and on the activated link, the application is selected for displaying the selected edition content. The selected edition content is accessed, using the selected application for display on the computing device.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1A:
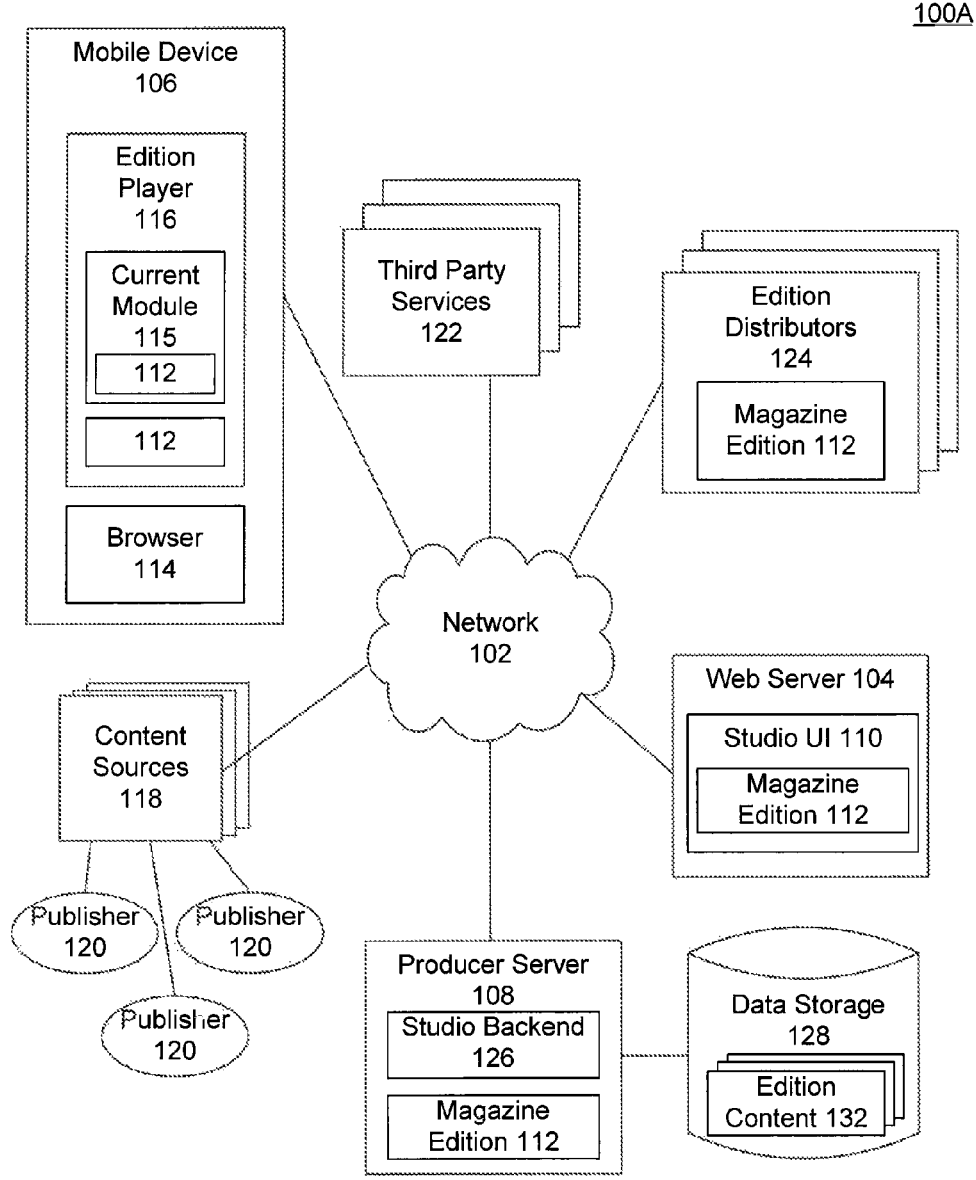
FIG. 1A is a block diagram of a distributed system environment, according to an embodiment.

Various embodiments of the invention are described below with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate certain embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

The approaches to distributing edition content of a magazine edition and accessing distributed edition content of a magazine edition that are described herein operate in the context of a magazine edition. Hence, an example version of a magazine edition for which edition content may be distributed and access will be discussed, in order to clarify a potential environment in which embodiments may operate. Aspects of distributing and accessing edition content of a magazine edition will be discussed as features that may be incorporated into a magazine edition.

FIG. 1A is a block diagram 100A of a distributed system environment. Distributed system environment 100A includes one or more networks 102, web servers 104, producer servers 108 and mobile devices 106.

Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

Web server 104 is a computing device or an application executing on a computing device that hosts multiple websites. A website is one or more resources associated with a domain name and hosted by one or more web servers 104. An example website is a collection of webpages formatted in hypertext markup language (HTML) that can contain text, images, multimedia content, and programming elements, such as scripts. Web server 104 hosts studio user interface ("UI") 110. Studio UI 110 enables users, such as publishers 120, to design interactive magazine editions 112 that may be distributed to multiple mobile devices 106. Publisher 120 may access studio UI 110 using a web address that is hosted on web server 104. Once accessed, publisher 120 may use studio UI 110 to design the layout of magazine edition 112 and configure content sources 118 for mobile devices 106 having different specifications.

In another embodiment, publisher 120 may download studio UI 110 onto a mobile device 106 as a standalone application or as a plugin or extension to a browser.

Magazine edition 112 may be designed using studio UI 110. Magazine edition 112 displays edition content to users in, for example, a format specified by publishers 120. However, unlike conventional applications that include a separate version for each mobile device having a particular operating platform, edition content displayed using magazine editions 112 may be displayed on mobile devices 106 in a format that is specified by a particular publisher, regardless of the native operating platform particular to mobile device 106. Magazine editions 112 may also layout edition content according to the size of a display screen of mobile device 106.

Mobile device 106 is an electronic device that is under the control of a user and is capable of requesting and receiving resources over network 102. Example mobile devices 106 are mobile communication devices such as smart phones and tablet computers. Mobile device 106 typically includes an application, such as a web browser (or simply browser) 114. A user controls browser 114 to request resources over network 102. A user requests a resource by typing the website address associated with the resources that is stored on web server 104. For example, a user, such as publisher 120 may use browser 114 to access studio UI 110 to design an interactive magazine edition using mobile device 106.

Mobile device 106 also includes edition player 116. Edition player 116 displays magazine editions 112 to users. Magazine edition 112 displays dynamic media content on mobile devices 106, where mobile devices have different specifications and display screen size. Edition content included in magazine editions 112 includes content downloaded to magazine editions 112 using content sources 118. To display magazine editions 112, edition player 116 may use a current module 115 or display edition content using edition player 116.

Current module 115 stores magazine editions 112 which are published by publisher 120. Current module 115 may be downloaded to mobile device 106 from, for example, producer server 108 using network 102 or using another interface. Typically, once current module 115 is downloaded to mobile device 106, a user uses current module 115 to subscribe to magazine editions 112. Once subscribed, current module 115 uses mobile device 106 to download magazine editions 112 from producer server 108, or edition distributor 124. Current module 115 also updates magazine edition 112 with new edition content. In an embodiment, current module 115 also provides a user with a listing of recommended magazine editions 112 that may be of interest to the user and that a user may subscribe to.

Producer server 108 includes studio backend 126. Studio backend 126 allows for a design, development and implementation of magazine editions 112. Studio backend 126 communicates with studio UI 110 when publisher 120 uses studio UI 110 to design magazine edition 112.

Once publisher 120 completes designing magazine edition 112 using studio UI 110, magazine edition 112 is uploaded to producer server 108 for storage and distribution. In an embodiment, magazine editions 112 may be stored on producer server 108 in a memory storage described in detail in FIG. 8. In another embodiment, publisher 120 may upload magazine edition 112 to edition distributors 124. A user may access edition distributor 124 and download magazine edition 112 to mobile device 106. In an embodiment, once publisher 120 decides to distribute an upgraded magazine edition 112, mobile devices 106 that include a previous version of magazine edition 112 are synchronized with the upgraded magazine edition 112.

Content sources 118 provide edition content 132 to magazine edition 112. Example content sources 118 include data feeds, RSS feeds, social streams, user-generated media sources, multi-media sources via media RSS, etc. Content source 118 is typically associated with a publisher 120. Publisher 120 owns a particular content source 118 and controls edition content 132 that is distributed via content sources 118 over network 102.

Producer server 108 receives edition content 132 from content sources 118. Once received, producer server 108 stores edition content 132 in data storage 128. Data storage 128 may be a memory storage described in detail in FIG. 8. In an embodiment, data storage 128 may include a database for storing edition content 132. When magazine edition 112 executing on edition player 116 requests edition content 132, producer server 108 retrieves edition content 132 is retrieved from data storage 128 and transmits edition content 132 to edition player 116.

Third party services 122 provide services to magazine editions 112. For example, third party services 122 provide streaming video that may be accessed by a uniform resource locator ("URL") link included in magazine edition 112. In another example, third party services 122 determine that a user read a particular post included in magazine edition 112. In another example, third party services 122 provide advertisements for display within magazine edition 112. In another example, third party services 122 provide check out services for merchandise items that are provided for purchase within magazine edition 112.

Edition distributors 124 distribute applications, such as magazine editions 112 to mobile devices 106. For example, when publisher 120 designs magazine edition 112, publisher 120 may elect a particular edition distributor 124 to distribute magazine edition 112. When publisher 120 elects to distribute magazine edition 112 using a particular edition distributor 124, magazine edition 112 is uploaded to edition distributor 124. A user may then use mobile device 106 to access edition distributor 124 and upload magazine edition 112 onto mobile device 106 for an agreed upon fee.

Figure 1B:
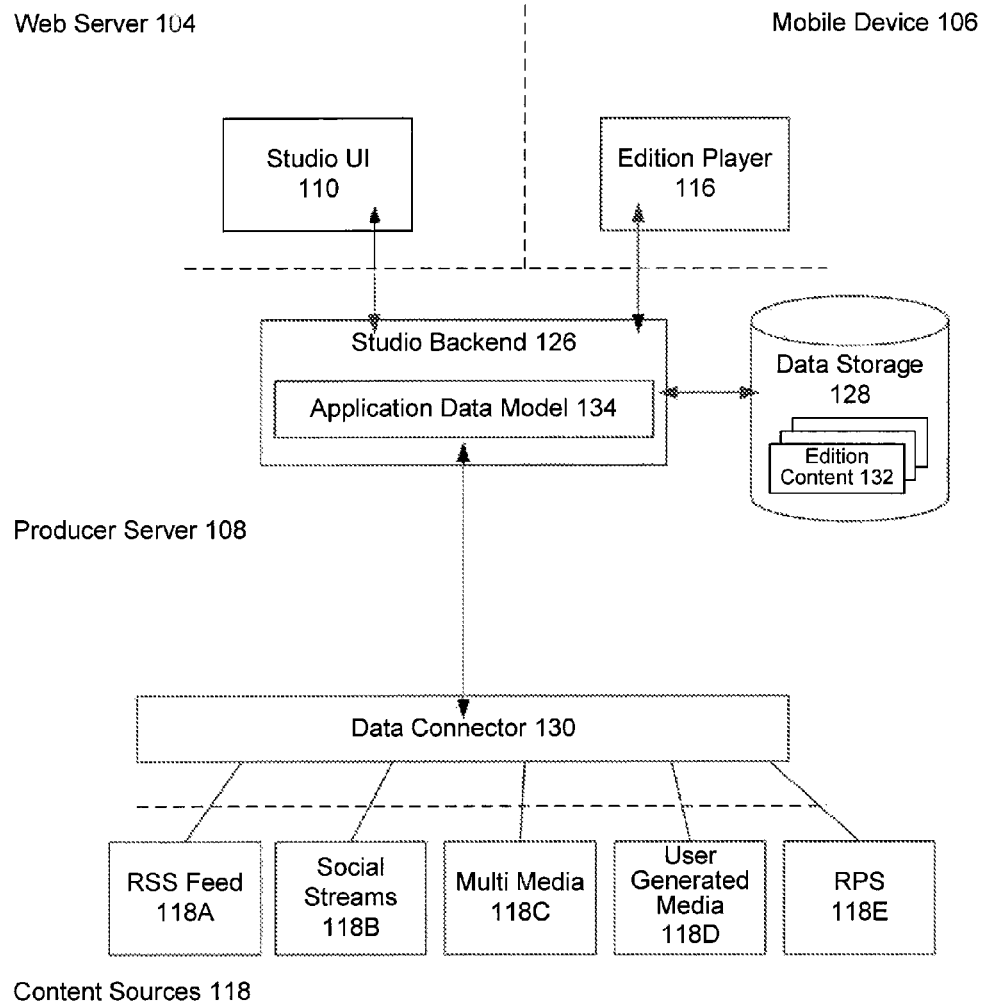
FIG. 1B is a block diagram of components in distributed system that generate and distribute magazine editions, according to an embodiment.

FIG. 1B is a block diagram 100B of components in distributed system 100 that generate and distribute magazine editions.

As described herein content sources 118 provide edition content 132 that is distributed across the web via network 102. For the edition content 132 to be distributed using magazine editions 112, content sources 118 are connected to producer server 108. In an embodiment, data connector 130 connects multiple content sources 118 and retrieves edition content 132.

Data connector 130 receives data from content sources 118. Data connector 130 may receive edition content 132 from content sources 118 in real-time or at configurable intervals that may be set by a system administrator. Once data connector 130 receives edition content 132 from content sources 118, data connector 130 transmits edition content 132 to data storage 128.

As described herein, data storage 128 distributes data from content sources 118 to magazine editions 112. For example, mobile device 106 may request data for particular magazine editions 112 at configurable time intervals that may be configured by the user subscribing to magazine editions 112.

Studio backend 126 receives the designed magazine editions 112 from studio UI 110. As described herein, studio UI 110 allows publishers 120 to design dynamic and interactive magazine editions that display edition content 132 provided by their content sources 118. Once publisher 120 completes designing magazine edition 112, publisher 120 uploads magazine edition 112 to studio backend 126. Studio backend 126 then stores the uploaded magazine editions 112 on producer server 108 and/or distributes magazine editions 112 to mobile devices 106 or edition distributors 124.

Studio backend 126 includes application data model 134. Application data model 134 (described in detail below), includes a format that displays edition content 132 within magazine editions 112. When publisher 120 uses studio UI 110 to create a particular magazine edition 112, studio UI 110 presents publisher 120 with application data model 134 framework that publisher 120 may configure to include edition content 120 for presentation to a user.

Upon a user request from mobile device 106, studio backend 126 may distribute magazine editions 112 to mobile devices 106. Each magazine edition 112 includes application data model 134 that is configured by publisher 120.

When magazine edition 112 is uploaded to mobile device 106, magazine edition 112 is populated with edition content 132. For example, producer server 108 provides edition content 132 from data storage 128 to magazine edition 112. As edition content 132 is updated with new edition content 132 from content sources 118, producer server 108 synchronizes edition content 132 included in magazine edition 112 with the new edition content 132 that is included in data storage 128.

In an embodiment, the synchronization may occur at configurable time intervals that may be configured by a user using mobile device 106. For example, a user may configure magazine edition 112 to query data storage 128 for new content every hour, every twelve hours, once a day, when requested by a user, etc. In a further embodiment, magazine edition 112 receives edition content 132 from data storage 128 that has been updated since the previous synchronization period, as to minimize the transmission of data over network 102.

Figure 1C:
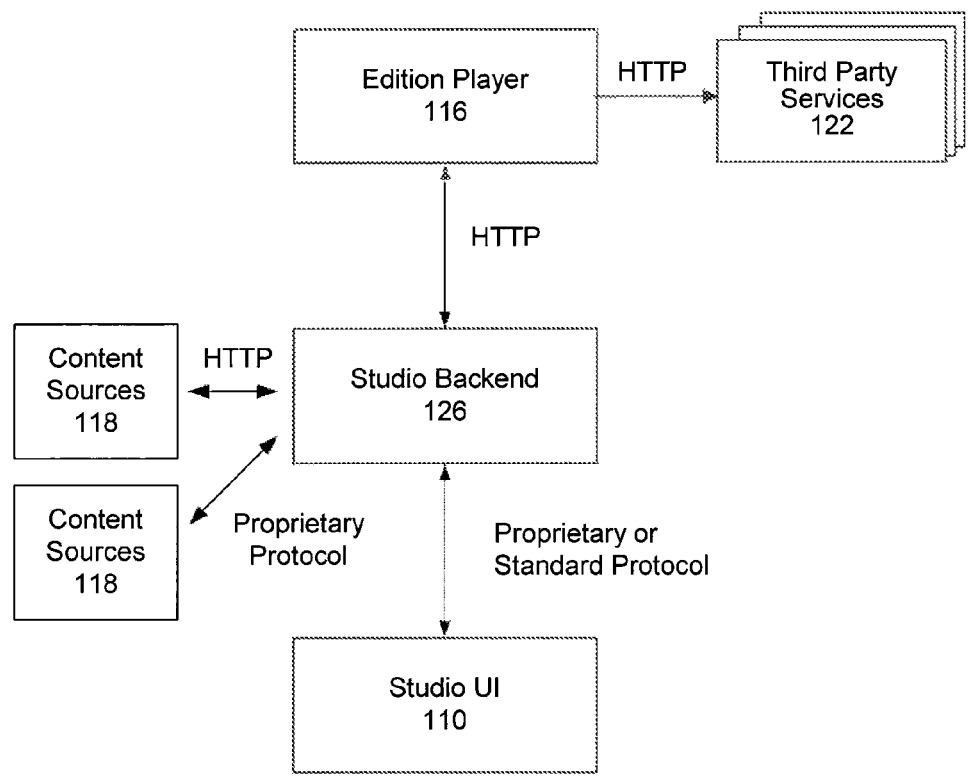
FIG. 1C is a block diagram that describes an example communication interfaces between the components within the distributed system, according to an embodiment.

FIG. 1C is a block diagram 100C that describes an example communication interface between the components within the distributed system.

For example, edition player 116 may communicate with studio backend 126 using HTTP over network 102. Edition player 116 may also communicate to third party services 122 and edition distributors 124 using HTTP.

Studio UI 110 may communicate with studio backend 126 using a Google Web Toolkit ("GWT") infrastructure. A person skilled in the art will appreciate that GWT allows web application developers to design JavaScript front-end applications using Java source code. In an embodiment GWT uses protocol buffers, also known to a person of ordinary skilled in that art, to pass data that includes magazine editions 112, templates, edition content 132, etc., between studio UI 110 and studio backend 126.

Studio backend 126 also communicates with a variety of content sources 118. In one embodiment, studio backend 126 may be configured to communicate with content sources 118 using a proprietary communication protocol that is specified by a particular content source 118. In another embodiment, studio backend 126 may also communicate with content sources 118 using HTTP.

Figure 2A:
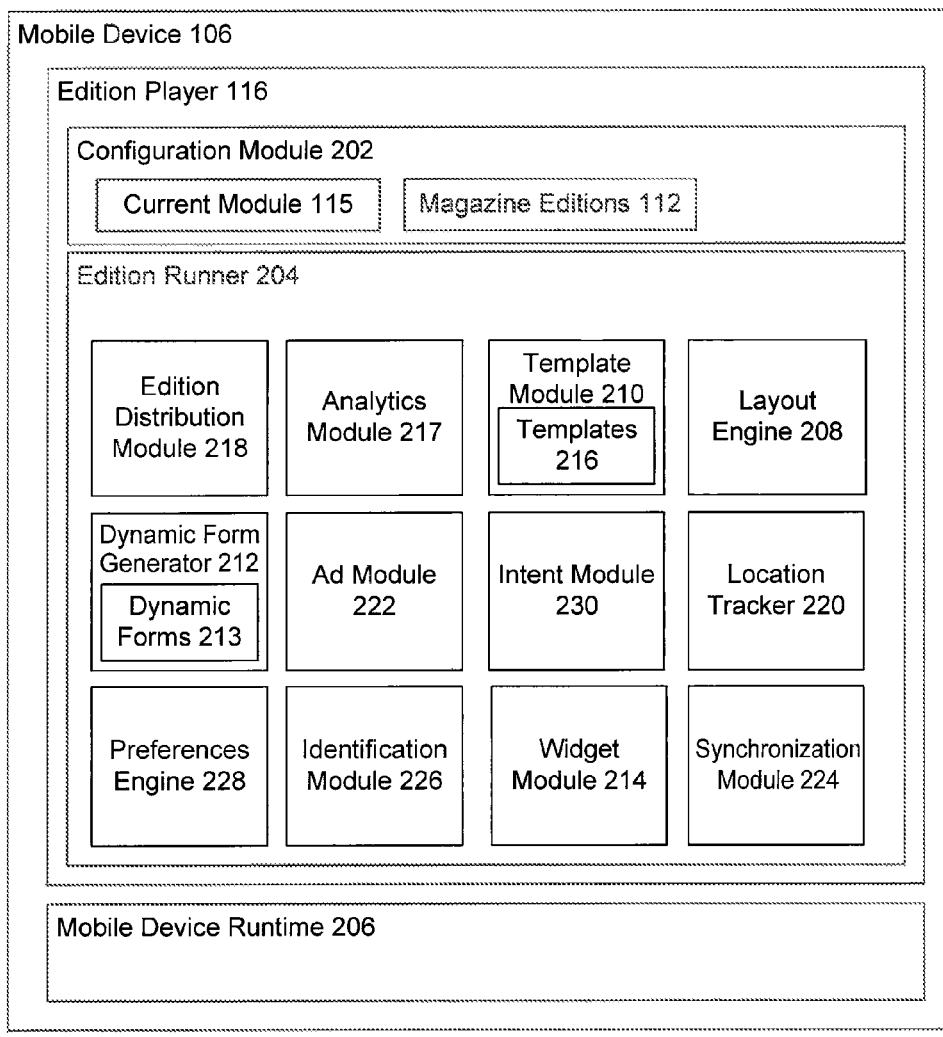
FIG. 2A is a block diagram of an edition player, according to an embodiment.

FIG. 2A is a block diagram 200 of an edition player. As described herein, edition player 116 displays magazine editions 112 to a user.

Edition player 116 includes a configuration module 202. Configuration module 202 determines a configuration mode that displays magazine edition 112 on edition player 116. For example, configuration module 202 may be configured to display magazine editions 112 using current module 115, in one embodiment. In another embodiment, configuration module 202 may be configured to display a single instance of magazine editions 112.

Edition runner 204 executes a configuration included in configuration module 202 and displays magazine editions 112. Example configuration may be executing a single instance of magazine edition 112 or executing current module 115 that provides a user with a selection of multiple magazine editions 112.

Edition runner 204 includes a layout engine 208. Layout engine 208 formats edition content 132 for display on mobile devices 106 having different specifications. Layout engine 208 receives edition content 132, using, for example, an HTML stream and generates a multi-column layout of edition content 132 that is appropriate for the display screen size and orientation of mobile device 106. Layout engine 208 interacts with template module 210, dynamic form generator 212 and widget module 214.

Template module 210 includes templates 216. Templates 216 control the rendering of the media content in magazine edition 112. Templates 216 may be native templates that are optimized for executing on edition runner 202, as they use the core mobile device runtime 206 libraries. Templates 216 may also be publisher 120 designed templates that display media content in a format designed by publisher 120. When magazine edition 112 is uploaded to mobile device 106, it stores templates 216 in template module 210.

Analytics module 217 tracks magazine editions 112, sections and posts within each magazine edition 112 viewed or read by a user. Analytics module 217 may compile a listing of the read content. The listing may be sent to publisher's 120 analytic account for determining edition content 132 that is interesting to users. The listing may also be sent to the user's account so that edition player 112 may provide a user with a history of edition content 132 that a user has read and/or accessed. Analytics module 217 may also track sections and posts within magazine editions 112 when a user browses magazine editions 112 offline (for example, without access to network 102). Once mobile device 106 is able to access network 102, analytics module 217 uploads the listing to publisher's 120 analytic account and/or user's account.

Edition distribution module 218 communicates with other applications, and distributes magazine editions 112 to third parties. Example third parties may include popular social networking sites, microblogging services, email accounts associated with users, etc., to name a few. Edition distribution module 218 may be accessed within magazine edition 112 when a user is viewing a particular post or section and causes edition player 116 to distribute the viewed content.

Location tracker 220 identifies a location, such as latitude and longitude location of mobile device 106. Once the location of mobile devices 106 is identified, edition content 132 included in magazine edition 112 may be tailored to a location of mobile device 106.

Advertisement module 222 inserts advertisements into edition content 132 displayed by magazine edition 112. Advertisement module 222 determines where and when to include advertisements within magazine edition 112. For example, when layout engine 208 renders edition content 132 on a mobile device 106 in a way that includes an unfilled space, advertisement module 222 detects the unfilled space and queries an advertisement system to select an advertisement for inclusion in the unfilled space in real-time. Advertisement module 222 also communicates with various advertising entities that provide advertisement module 222 with advertisements for display within magazine edition 112.

Dynamic form generator 212 generates dynamic forms 213. Dynamic forms 213 render an arbitrary section within magazine edition 112 based on metadata provided by individual users. For example, dynamic forms 213 may be used to display submissions by individual users who, for example, practice citizen journalism.

Synchronization module 224 communicates with a studio backend 126 and retrieves edition content 132 from data storage 128. Synchronization module 224 also identifies the subscriptions that a user subscribed to using particular magazine editions 112 and synchronizes the edition content 132 included in the subscriptions with edition content 132 provided by content sources 118.

Widget module 214 enhances edition content 132 displayed in magazine edition 112. For example, when a slide show is included in edition content 132, widget module 214 renders the slide show. In another example, when edition content 132 includes geo-coordinates, widget module 214 launches an application that displays a map. In another example, when edition content 132 includes a video application, widget module 214 launches a video display application, etc. A person skilled in the art will appreciate that the embodiments above are given by way of example and not limitation and that other means for enhancing edition content 132 may be used.

Identification module 226 identifies a user that uses mobile device 106 and subscribes to particular magazine editions 112.

Preferences engine 228 determines the configuration of a user. For example, a user may configure time intervals for when magazine edition content is synchronized with studio backend 126.

Mobile device runtime 206 executes edition runner 204. Mobile device runtime 206 is a runtime that is native to mobile device 106. Mobile device runtime 206 allows a user to use edition player 116 to view magazine editions 112 on mobile device 106. Typically, mobile device 106 includes different mobile device runtimes 206 that execute mobile device 106 specific operating platforms.

Figure 2B:
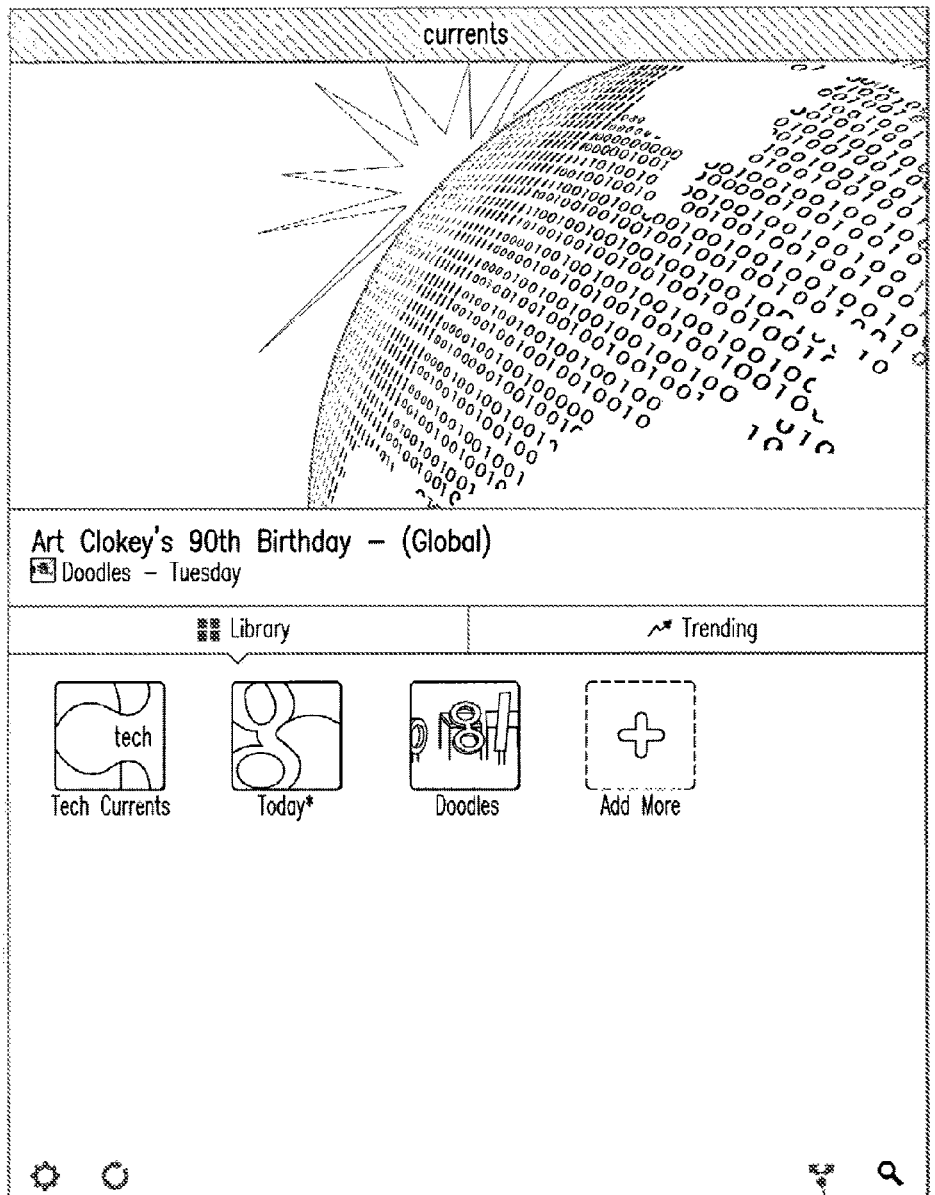
FIG. 2B is an example display view of a current module for displaying multiple magazine editions, according to an embodiment.

FIG. 2B is an example display view of a current module for displaying multiple magazine editions, according to an embodiment. FIG. 2B shows several icons, each associated with a magazine edition 112, that may be used to access specific magazine editions 112. FIG. 2B also includes an edition distribution control 230. Edition distribution control 230 may be used to activate edition distribution module 218 as discussed above in the discussion of FIG. 2A. The edition distribution process is further detailed below in the discussion of FIGS. 3-5.

Figure 3:
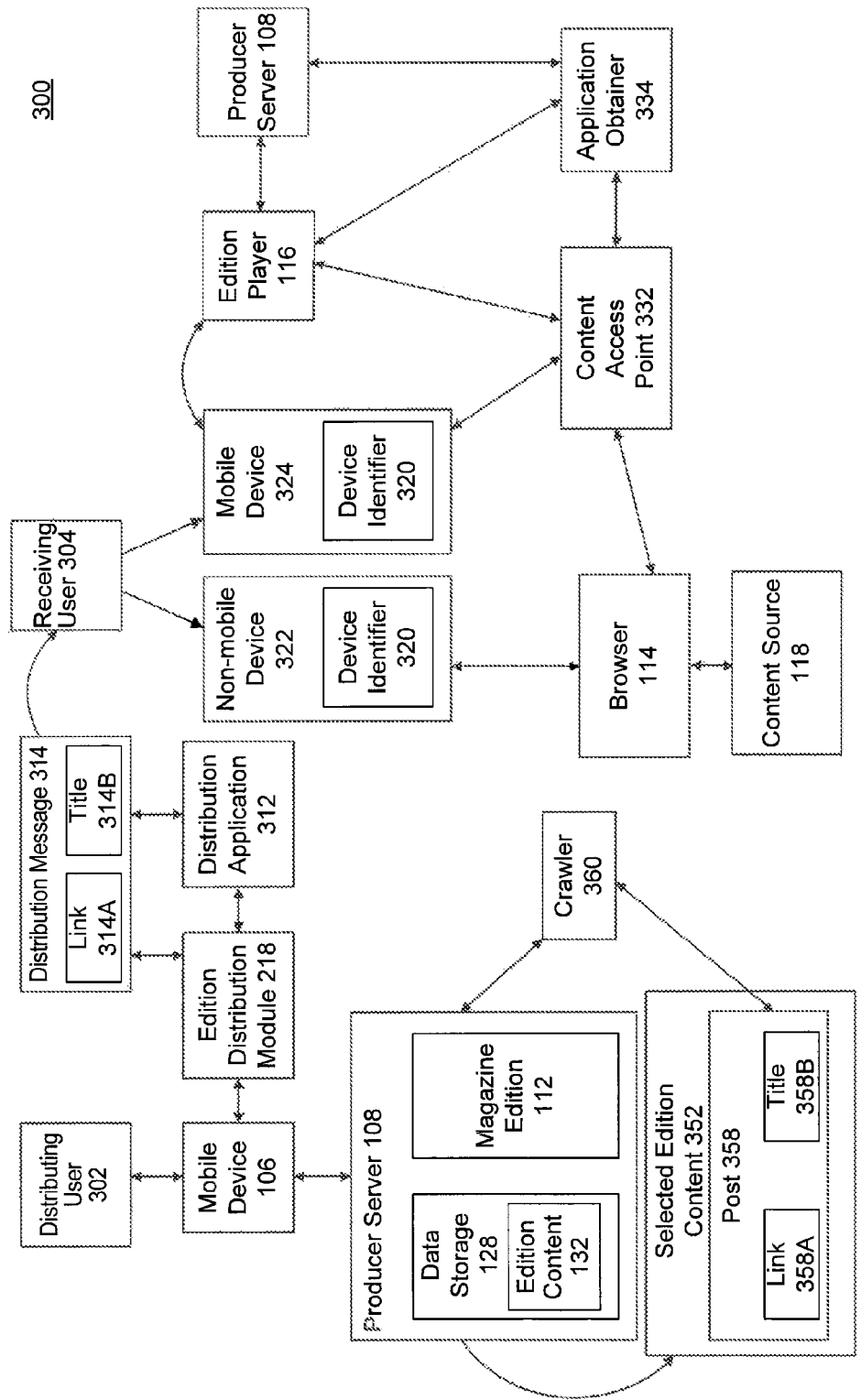
FIG. 3 is a block diagram of a system for distributing edition content of a magazine edition, according to an embodiment.

FIG. 3 is a block diagram of a system 300 for distributing edition content of a magazine edition, according to an embodiment. While various aspects of a magazine edition have been characterized with respect to the prior figures, FIG. 3 is illustrative of an example embodiment that is specifically designed to facilitate distribution and sharing of edition content between users. Embodiments can operate from the perspective of a distributing user or a receiving user, as provided in example methods shown in FIGS. 4 and 5. For example, example methods may provide for distributing or accessing edition content of a magazine edition. However, FIG. 3 illustrates the overall flow of information in example system 300 that manages the flow of edition content 132 of magazine edition 112 between users, including additional optional features and improvements that may be part of example system 300.

System 300 distributes edition content 132 of magazine edition 112 on behalf of distributing user 302, to be accessed by receiving user 304. The method begins when distributing user 302 activates mobile device 106. It may be noted that system 300 does not necessarily distribute actual content itself. For example, suppose that distributing user 302 desires to distribute post 358. Instead of distributing post 358 itself, system 300 may distribute link 358A and title 358B associated with post 358 and thereby provide access to post 358 by providing location information for post 358.

When distributing user 302 activates mobile device 106, the activation may include pushing a share button or otherwise activating a control (such as a control on a touchscreen) on mobile device 106 that lets mobile device 106 know that distributing user 302 wishes to share selected edition content 352. The button or control activates edition distribution module 218. As discussed, this can be accomplished by physical input, such as a button or a touch on a touch screen display. For example, distributing user 302 may activate edition distribution module 218 by touching edition distribution control 230. However, other approaches, such as a voice command, may be used as well to activate edition distribution module 218.

Distributing user 302 also needs to specify to mobile device 106 which specific pieces of selected edition content 352 from edition content 132 of magazine edition 112 he or she wishes to share. For example, in an embodiment mobile device 106 may present a variety of posts from edition content 132 from data storage 128 on its screen as possible selections. Mobile device 106 receives an indication that distributing user 302 would like to distribute a post 358 as selected edition content 352. Mobile device 106 may then prompt distributing user 302 to specify which edition content 132 from data storage 128 he or she would like to share as selected edition content 352. Once again, specifying which selected edition content 352 is to be shared may be performed in a wide variety of ways. For example, distributing user 302 may activate an icon or menu item displayed on the screen of mobile device 106, search for edition content 132 to be shared as selected edition content 352, use voice recognition or so on.

For example, distributing user 302 at mobile device 106 may desire to share selected edition content 352 from magazine edition 112. Selected edition content 352 may be stored as edition content 132 in data storage 128 that provides content to magazine edition 112. Selected edition content 352 may include one or more posts from data storage 128, such as post 358. Suppose that post 358 is a review of a new science fiction movie. As discussed, distributing user 302 may specify that he or she would like to share post 358.

In general, selected edition content 352, such as post 358, may be stored in data storage 128 in a way such that a crawler 360, which is an optional part of system 300 of FIG. 3, is able to index posts in data storage 128 such as post 358. A crawler (or web crawler) is a computer program that browses the World Wide Web in a methodical, automated manner or in an orderly fashion. Many sites, in particular search engines, use web crawlers as a means of providing up-to-date data. Web crawlers are mainly used to create a copy of all the visited pages for later processing by a search engine that will index the downloaded pages to provide fast searches.

To facilitate the ability of crawler 360 to index data storage 128 properly, producer server 108 may be designed to store posts such as post 358 in data storage 128 in a manner such that data storage 128 stores information about content source 118 of the posts it contains. In this manner, crawler 360 is able to link directly to content source 118 of a post, such as post 358. The advantage of this approach is that crawler 360 can ensure that when posts appear as search results, users are directed to their original content source 118. It is advantageous to users to provide original content source 118 because it may be easier to find related content from original content source 118 of post 358, and it is advantageous to the provider of post 358 because they can then provide further content to the user, which may be helpful, for example, if the provider of post 358 wants to show ads to the user as they access content, thereby earning revenue by providing information.

After mobile device 106 receives a signal that distributing user 302 wishes to share selected edition content 352, mobile device 106 invokes edition distribution module 218. Edition distribution module 218 provides distributing user 302 with a selection of distribution applications 312 such as an e-mail application or a social networking application. In an embodiment, the number of distribution applications 312 that may be provided by edition distribution module 218 may depend on a type of client 106 that runs magazine edition 112. Distribution application 312 generates distribution message 314. Distribution message 314 includes information identifying the location of selected edition content 352. For example, the information identifying the location may be a link, web address, URL, shortened URL, or other standardized location information that can be used to retrieve selected edition content 352.

Additionally, distribution message 314 may include information that may be used to preview selected edition content 352. For example, distribution message 314 may include a fragment of post 358 (such as an image or an excerpt) or a title.

In an embodiment, information included in distribution message 314 depends on a type of a distribution application 312 that is selected to distribute the content. For example, when distribution application 312 is a social network, distribution message 314 may include a fragment of post 358 that includes a URL link and title of the selected edition content 352. In another example, when distribution application 312 is an email application, distribution message 314 may include a fragment of post 358 that includes an abstract and/or an image included in the selected edition content 352.

As portrayed in FIG. 3, distribution message 314, in a non-limiting example, may include link 314A and title 314B. This information in distribution message 314 may include link 358A and title 358B that are stored with post 358 as selected edition content 352. Continuing the example of the movie review, distribution message 314 might include link 314A to a movie review from a newspaper's web site, as well as title 314B of the review. Link 314A is a text string, that may include, in part, link 358A.

Distribution message 314 may include other information in addition to or in lieu of link 314A and title 314B. What is advantageous is that distribution message 314 includes sufficient information such that receiving user 304 is able to determine if selected edition content 352 is of interest, and access selected edition content 352. While distribution message 314 as shown in FIG. 3 includes a single link 314A and a single title 314B, it may be noted that a distribution message 314 may include information about multiple pieces of selected edition content 352. Alternatively, multiple distribution messages may be sent, each describing a single piece of selected edition content 352 or a subset of the selected edition content 352 to be distributed.

In another embodiment, link 314A may include, in part, a web address of a web server that accesses and retrieves post 352 from data storage 128.

In an embodiment, link 314A may also include information that determines how selected edition content 352 is displayed on mobile device 314 of receiving user 304. For example, link 314A may include information, in the form of a character string, that indicates that selected edition content 352 may be opened using edition player 116 on mobile device 314, when edition player 116 is installed on mobile device 314. In another embodiment, link 314 may include characters that indicate that selected edition content 352 may be opened using a particular magazine edition 112, if it was previously uploaded, on mobile device 314.

Once edition distribution module 218 completes generating distribution message 314, distribution application 312 transmits distribution message 314 to receiving user 304.

After distribution application 312 transmits distribution message 314, receiving user 304 receives distribution message 314. Distribution message 314 allows receiving user 304 to access selected edition content 352 in a manner that is dependent on the computing device and preferences of receiving user 304.

When receiving user 304 receives distribution message 314, receiving user 304 may activate link 314A in distribution message 314 to view selected edition content 352. The presentation of selected edition content 352 may depend on a type of mobile device, such as mobile device 324 or non-mobile device 322 used by receiving user 304.

Device identifier 320 establishes whether receiving user 304 is using a non-mobile device 322 or a mobile device 324. Device identifier 320, which may be a subsystem of non-mobile device 322 or mobile device 324 may accomplish this goal, for example, by querying the identity of the operating system and deciding based on which operating system is present whether a non-mobile device 322 or a mobile device 324 is present. It may be noted that in this context, the term "non-mobile" refers to a computing device that runs a standard microcomputer operating system, such that it provides a full browser 114, and may include laptops, notebooks, and netbooks as well as towers, minitowers, and so on. "Mobile" devices refer to devices, such as smart phones and tablets, that run operating systems that are designed for mobile use and are able to load and run mobile applications, which may be the same or different mobile device as mobile device 106. The ability to run mobile applications is important because part of the functionality of embodiments is the ability to facilitate distributing the content using an application on a mobile device. For example, such an application may be edition player 116, described above.

When device identifier 320 establishes that receiving user 304 is using a non-mobile device 322, then non-mobile device 322 will not be compatible with an edition player 116 that provides access to selected edition content 352. In this situation, receiving user 304 at non-mobile device 322 is routed to content source 118 or another location that publisher 120 uses to provide edition content 132 on non-mobile devices 322. In one embodiment, the routing may occur when receiving user 304 activates link 314A using non-mobile device 322. When activated, non-mobile device 322 may use the web address included in link 314A to request selected edition content 352 using content access point 332. Included in the request, may be the type of the computing device as identified by device identifier 320. When content access point 332 determines that the computing device is non-mobile device 322, content access point 332 may route the request for selected edition content 352 to content source 118 or another location specified by publisher 120. In this embodiment, the web address of content source 118 may be retrieved from data storage 128, whose web address is also included in link 314A. Once the request is received by content source 118, content source 118 transmits selected edition content 352 to non-mobile device 322 for display, using, for example, browser 114.

However, if device identifier 320 establishes that receiving user 304 is using mobile device 324, then receiving user 304 is provided with options for accessing selected edition content 352. For example, when receiving user 304 activates link 314A, mobile device 324 may use the web address included in link 314A to request selected edition content 352 using content access point 332.

Content access point 332 offers receiving user 304 a selection of applications for accessing selected edition content 352 at content source 118. Example applications may include browser 114, edition player 116, magazine edition 112 or another application that is installed or may be installed on mobile device 324. Content access point 332 may also provide receiving user 304 with an option for downloading an application for viewing selected edition content 352.

If receiving user 304 chooses to access selected edition content 352 with browser 114, mobile device 324 redirects receiving user 304 to content source 118 in a manner that is similar to the way in which receiving user 304 may be redirected to content source 118 if he or she were using a non-mobile device 322 to access selected edition content 352.

However, if receiving user 304 is using mobile device 324 and receiving user 304 chooses to access selected edition content 352 from magazine edition 112, content access point 332 will establish whether edition player 116 is available. If so, content access point 332 will access selected edition content 352 through previously installed edition player 116. If edition player 116 is not available, content access point 332 will cause application obtainer 334 to offer receiving user 304 a link to producer server 108 or another location from which edition player 116 may be uploaded to mobile device 106. Thus, when receiving user 304 activates the link from application obtainer 334, producer server 108 installs edition player 116.

At this point edition player 116 will load, using information included in link 314A, selected edition content 352 from edition content 132 and a corresponding magazine edition 112. Edition player 116 may also load other edition content 132 that is included in magazine edition 112 that includes selected edition content 352.

In another embodiment, receiving user 304 may elect to download magazine edition 112 without installing edition player 116. In yet another embodiment, receiving user 304 may elect another application provided by content access point 332 to view selected edition content 352.

In another embodiment, mobile device 324 may provide receiving user 304 with a selection of applications for viewing selected edition content 352. The selection of applications may be based on the information included in link 314A. For example, link 314A may be parsed on mobile device 324.

When parsed link 314A includes information that activates a particular application on mobile device 324, the receiving user 204 may be presented with an option on mobile device 324 to open selected edition content 352 with that particular application, along, with an option of being routed to content access point 332. If receiving user 304 selects the application (and the application is present on mobile device 324), receiving user 304 is able to view selected edition content 352 using the application. For example, once the application is selected, receiving user may use the location information in link 314A to retrieve selected edition content 352 from data storage 128.

Figure 4:
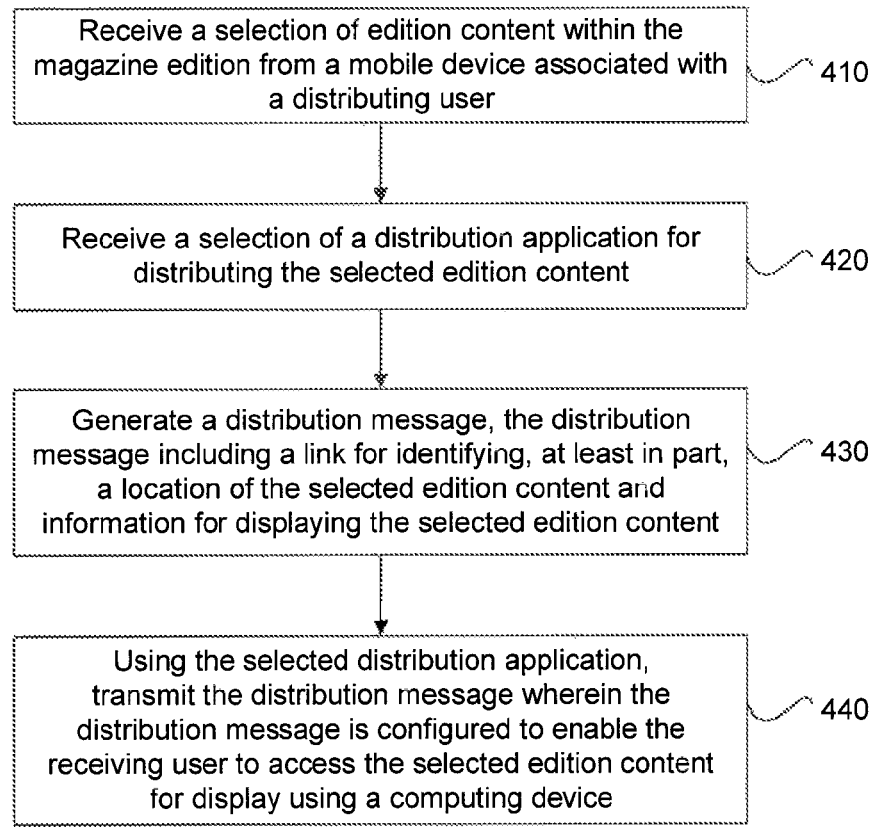
FIG. 4 is a flowchart of a method for distributing edition content of a magazine edition, according to an embodiment.

FIG. 4 is a flowchart 400 of a method for distributing edition content of a magazine edition, according to an embodiment.

At stage 410, a selection of edition content within the magazine edition from a mobile device associated with a distributing user is received. As discussed previously, stage 410 involves both mobile device 106 receiving an indication from distributing user 302 that he or she would like to distribute content, as well as an identity of the specific selected edition content 352 to distribute. Also as discussed previously, distributing user 302 may use any form of input that specifies to mobile device 106 his or her intention to distribute selected edition content 352, as well as which specific selected edition content 352 to distribute.

At stage 420, a selection of a distribution application for distributing the selected edition content is received. For example, distributing user 302 may enter a selection of a distribution application 412 into mobile device 106 by using edition distribution module 218. Distribution application 312 may include any application that is capable of transmitting a message, such as an e-mail application and a social networking application. Distribution application 312 should be able to attach information to distribution message 314 that, as discussed, is able to specify a location of selected edition content 352, as well as identifying information so that receiving user 304 is to gauge his or her interest in the distributed content.

At stage 430, a distribution message is generated, the distribution message including a link for identifying, at least in part, a location of the selected edition content and information for displaying the selected edition content. For example, mobile device 106 may invoke distributing application 312 selected in stage 420. As part of invoking distributing application 312, mobile device 106 may gather together information pertaining to selected edition content 352 that was established in stage 410. This information is packaged into distribution message 314. Such information, as discussed, should specify information that helps identify the location and ways to display selected edition content 352. For example, distribution message 314 may include link 314A, title 314B, and/or other pertinent information. Selected edition content 352 has herein been characterized as one or more posts 358 that may include content such as an article, a video, a single image, a "tweet", a slide show, a map or any other unit of content. Additionally, post 358 may include multiple constituent items.

At stage 440, using the selected distribution application, the distribution message is transmitted wherein the distribution message is configured to enable the receiving user to access the selected edition content for display using a computing device. Distribution message 314 includes information identifying the location of the selected edition content to a receiving user, wherein the receiving user uses distribution message 314 to access the selected edition content for viewing using a computing device. For example, distribution application 312 may send distribution message 314 to receiving user 304. Distribution message 314 should contain location information associated with selected edition content 352. Because distribution message 314 contains location information (such as link 314A) associated with selected edition content 352, receiving user 304 will be able to use the location information to access the relevant content.

As discussed previously in connection with FIG. 3, the actual use of the information from distribution message 314 to access selected edition content 352 depends upon whether receiving user 304 is using a non-mobile device 322 or a mobile device 324. Ways in which this access may occur are discussed in greater depth, below.

Figure 5:
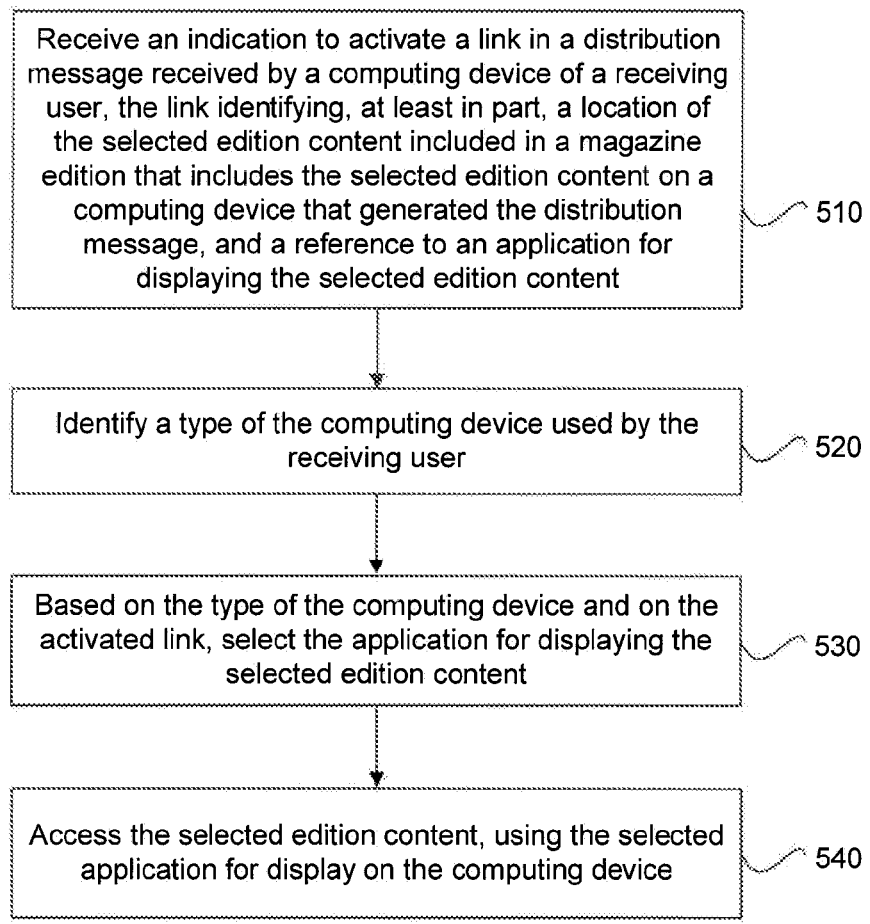
FIG. 5 is a flowchart of a method for accessing distributed edition content of a magazine edition, according to an embodiment.

FIG. 5 is a flowchart 500 of a method for accessing distributed edition content of a magazine edition, according to an embodiment.

At stage 510, an indication is received to activate a link in a distribution message received by a computing device of a receiving user, the link identifying, at least in part, a location of the selected edition content included in a magazine edition that includes the selected edition content on a computing device that generated the distribution message, and a reference to an application for displaying the selected edition content. Distribution message 314 includes link 314A identifying the location of selected edition content 352 within magazine edition 112 selected by a distributing user for distribution. For example, receiving user 304 may have received distribution message 314 generated by mobile device 106 used by distributing user 302. As discussed in connection with FIG. 4, distribution message 314 may include information identifying the location of selected edition content 352 (such as link 314A) so that receiving user 304 is able to access it. Computing device of receiving user 304 receives the indication that receiving user 304 wants to activate link 314A, and can then proceed with the subsequent stages to access selected edition content.

At stage 520, a type of the computing device used by the receiving user is identified. For example, device identifier 320 may establish that receiving user 304 is using mobile device 324, or alternatively non-mobile device 322. As discussed elsewhere, this may be accomplished in various ways, such as by identifying which operating system the computing device uses.

At stage 530, based on the type of the computing device and on the activated link, the application is selected for displaying the selected edition content. For example, if the computing device used by receiving user 304 is non-mobile device 322, selected edition content 352 may be viewed at content source 118 using browser 114. Alternatively, if the computing device used by receiving user 304 is mobile device 324, content access point 332 may provide access to selected edition content 352 in a browser 114 or edition player 116. For example, content access point 332 may utilize browser 114 to provide access to selected edition content 352 at content source 118. However, content access point 332 may also access selected edition content 352 using edition player 116. For example, magazine edition 112 may be selected to display edition content 132 using edition player 116.

At stage 540, the selected edition content is accessed, using the selected application for display on the computing device. Thus, based on the results of stage 530, selected edition content may be displayed in browser 114 or edition player 116.

However, the methods of FIG. 4 and FIG. 5 may additionally be extended with further features. For example, the methods may include additional steps based on whether the device used by receiving user 304 is mobile device 324 or non-mobile device 322. As previously discussed, when the device is mobile device 324, the method may include accessing received selected edition content 352 using browser 114 or edition player 116. Alternatively, when the device is non-mobile device 322, the method may include accessing the received selected edition content 352 at content source 118 using browser 114, wherein the received selected edition content 352 includes a reference to the location of content source 118 (such as link 314A).

Furthermore, when the device used by the receiving user is mobile device 324 and received selected edition content 352 is accessed in browser 114, redirecting the receiving user to content source 118 of the selected edition content 352 in browser 114 at mobile device 324 may occur, accessed via content access point 332. When the device used by the receiving user is mobile device 324 and received selected edition content 352 is accessed in edition player 116, received selected edition content 352 may be accessed as magazine edition 112 in edition player 116.

Furthermore, a method may include stages to ensure that edition player 116 is available. It is determined if edition player 116 is already present on mobile device 324. When edition player 116 is already present on mobile device 324, the selected edition content 352 is accessed in edition player 116; and when the edition player 116 is not already present on mobile device 324, a link is provided to receiving user 304 that, when activated, installs edition player 116 on the mobile device, wherein when edition player 116 is loaded for the first time, selected edition content 352 is displayed.

It may be noted that installation of edition player 116 on mobile device 324 utilizes a source that may be selected based on an operating system run by mobile device 324.

Thus, the above-described embodiments provide approaches to distributing and receiving edition content of a magazine edition that facilitate sharing between a distributing user and a receiving user. Moreover, the approaches help tailor sharing information in a way that is adapted well to the specific device used by the receiving user.

Figure 6:
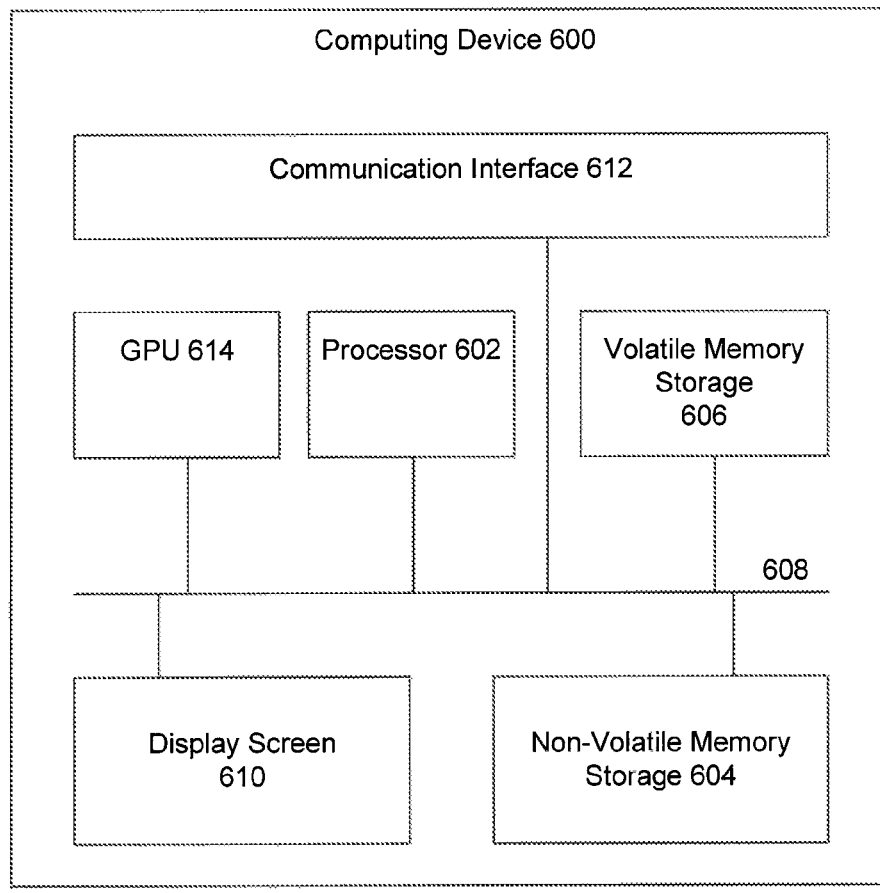
FIG. 6 is a block diagram of a computer system in which embodiments of the invention can be implemented.

FIG. 6 is an example computer system 600 in which embodiments of the present invention, or portions thereof, may be implemented as computer-readable code. For example, the components or modules of distributed system 100, such as studio UI 110, magazine editions 112, current module 115, edition player 116, studio backend 126, etc., may be implemented in one or more computer systems 600 using hardware, software, firmware, tangible computer-readable media having instructions stored thereon, or a combination thereof and may be implemented in one or more computer systems or other processing systems. Modules and components in FIGS. 1-5 may be embodied in hardware, software, or any combination thereof.

Mobile device 106, web server 104 and producer server 108 may include one or more computing devices that include a computer system 600. Computer system 600 may include one or more processors 602, one or more non-volatile storage mediums 604, one or more memory devices 606, a communication infrastructure 608, a display screen 610 and a communication interface 612.

Processors 602 may include any conventional or special purpose processor, including, but not limited to, digital signal processor (DSP), field programmable gate array (FPGA), and application specific integrated circuit (ASIC).

GPU 614 is a specialized processor that executes instructions and programs, selected for complex graphics and mathematical operations, in parallel.

Non-volatile storage 604 may include one or more of a hard disk drive, flash memory, and like devices that may store computer program instructions and data on computer-readable media. One or more of non-volatile storage device 604 may be a removable storage device.

Memory devices 606 may include one or more volatile memory devices such as but not limited to, random access memory. Communication infrastructure 608 may include one or more device interconnection buses such as Ethernet, Peripheral Component Interconnect (PCI), and the like.

Typically, computer instructions are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments may employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all example embodiments of the present invention as contemplated by the inventor(s), and thus, are not intended to limit the present invention and the appended claims in any way.

The breadth and scope of the present invention should not be limited by any of the above-described example embodiments, but should be defined only in accordance with the following claims and their equivalents.

What is claimed is:

1. A computer-implemented method for distributing edition content of a magazine edition, comprising:
    receiving a selection of edition content within the magazine edition from a first mobile device associated with a distributing user;
    receiving a selection of a distribution application for distributing the selected edition content;
    generating a distribution message for receipt by a receiving user specified by the distributing user, the distribution message including at least a link for identifying, at least in part, (i) a location of the selected edition content, and (ii) information that determines compatibility of a second mobile device with the distribution application based on a device identifier of the second mobile device, and how the selected edition content is displayed on the second mobile device; and
    transmitting the distribution message using the selected distribution application, wherein the distribution message is configured to (i) determine whether to change the location of the selected edition content based on the device identifier and (ii) enable the receiving user to access the selected edition content for display using the second mobile device.

2. The computer-implemented method of claim 1, further comprising:
    including a portion of the selected edition content in the distribution message, wherein the portion of the selected edition content is based, at least in part, on a type of the selected distribution application.

3. The computer-implemented method of claim 1, further comprising:
    including, in the information specifying how the selected edition content is displayed, a reference for displaying the content using a particular application on the computing device.

4. The computer-implemented method of claim 1, further comprising:
    including, in the information specifying how the selected edition content is displayed, a reference for displaying the selected edition content using a web browser.

5. The computer-implemented method of claim 1, further comprising:
    including, in the information specifying how the selected edition content is displayed, a reference for displaying the content using a magazine edition installed on the computing device of a receiving user.

6. A computer-implemented method for displaying the edition content, comprising:
    receiving an indication from a mobile device associated with a distributing user to activate a link in a distribution message received by a computing device of a receiving user, the link identifying, at least in part, (i) a location of the selected edition content included in a magazine edition that includes the selected edition content on a computing device that generated the distribution message, and (ii) information that determines compatibility of the computing device with the distribution application based on a device identifier of the computing device and how the selected edition content is displayed on the computing device of the receiving user;
    identifying a type of the computing device used by the receiving user based on the device identifier;
    based on the type of the computing device of the receiving user and on the activated link, determining whether to change the location of the selected edition content and selecting an application for displaying the selected edition content; and accessing the selected edition content, using the selected application for display on the computing device of the receiving user.

7. The computer-implemented method of claim 6, further comprising:

identifying the type of the computing device used by the receiving user as a receiving mobile device based on the device identifier;

determining whether the information specifying how the selected edition content is displayed includes a reference to the application on the receiving mobile device;

based on the determining, activating the application;

retrieving the selected edition content; and displaying the selected edition content using the activated application.

8. The computer-implemented method of claim 6, further comprising:

identifying the type of a computing device used by the receiving user as a receiving mobile device based on the device identifier;

based on the identifying, accessing a content access point for a selection of applications for displaying the selected edition content;

selecting an application for displaying the selected edition content from the selection of applications; and displaying the selected edition content using the selected application.

9. The computer-implemented method of claim 8, further comprising:

selecting a web browser to display the selected edition content;

determining a web address of an original source for displaying the selected edition content, wherein the original source generates the selected edition content; and retrieving the selected edition content from the original source for display on the web browser of the receiving mobile device.

10. The computer-implemented method of claim 8, further comprising:

selecting an edition player to display the selected edition content;

determining if the edition player is installed on the receiving mobile device;

in response to determining whether the edition player is installed on the receiving mobile device, accessing the selected edition content using the edition player; and in response to determining the edition player is not installed on the receiving mobile device, installing the edition player on the receiving mobile device to display the selected edition content.

11. The computer-implemented method of claim 8, further comprising:

selecting a magazine edition to display the selected edition content;

accessing the selected edition content using a data storage; and retrieving the selected edition content from the data storage for display on the web browser of the receiving mobile device.

12. The computer-implemented method of claim 6, further comprising:

identifying that the type of the computing device is a non-mobile device; and based on the identifying, selecting a web browser to display the selected edition content;

determining a web address of the original source for displaying the selected edition content; and retrieving the selected edition content from the original source for display on the web browser of the non-mobile device.

13. A system for distributing edition content of a magazine edition, comprising:

a first receiver configured to receive a selection of edition content within the magazine edition from a mobile device associated with a distributing user;

a second receiver configured to receive a selection of a distribution application to distribute the selected edition content;

a generator configured to generate a distribution message, the distribution message including a link for identifying, at least in part, (i) a location of the selected edition content and (ii) information that determines compatibility of a second mobile device with the distribution application based on a device identifier of the second mobile device and how the selected edition content is displayed; and a transmitter configured to transmit the distribution message using the selected distribution application, wherein the distribution message is configured to (i) determine whether to change the location of the selected edition content based on the device identifier and (ii) enable the receiving user to access the selected edition content for display using a computing device.

14. The system of claim 13, wherein the generator is further configured to:

include a portion of the selected edition content in the distribution message, wherein the portion of the selected edition content is based, at least in part, on a type of the selected distribution application.

15. The system of claim 13, wherein the generator is further configured to:

include, in the information specifying how the selected edition content is displayed, a reference for displaying the content using a particular application on the computing device.

16. The system of claim 13, wherein the generator is further configured to:

include, in the information specifying how the selected edition content is displayed, a reference for displaying the selected edition content using a web browser.

17. The system of claim 13, wherein the generator is further configured to:

include, in the information specifying how the selected edition content is displayed, a reference for displaying the content using a magazine edition installed on the computing device of a receiving user.

18. A system for displaying edition content, comprising:

a receiver configured to receive from a mobile device associated with a distributing user an indication to activate a link in a distribution message received by a computing device of a receiving user, the link identifying, at least in part, (i) a location of the selected edition content included in a magazine edition that includes the selected edition content on a computing device that generated the distribution message, and (ii) information that determines compatibility of the computing device with the distribution application based on a device identifier of the computing device and how the selected edition content is displayed on the computing device of the receiving user;

a computing device identifier configured to identify a type of the computing device used by the receiving user based on the device identifier;

a selector configured to determine whether to change the location of the selected edition content and select an application for displaying the selected edition content based on the type of the computing device of the receiving user, and on the activated link; and a display access device configured to access the selected edition content, using the selected application for display on the computing device of the receiving user.

19. The system of claim 18, wherein:

the computing device identifier is further configured to:

identify the type of the computing device used by the receiving user as a receiving mobile device based on the device identifier;

determine whether the information specifying how the selected edition content is displayed includes a reference to the application on the receiving mobile device;

based on the determining, activate the application; and retrieve the selected edition content; and the display access device is further configured to display the selected edition content using the activated application.

20. The system of claim 18, wherein:

the computing device identifier is further configured to:

identify the type of a computing device used by the receiving user as a receiving mobile device based on the device identifier;

based on the identifying, access a content access point for a selection of applications for displaying the selected edition content; and select an application for displaying the selected edition content from the selection of applications; and the display access device is further configured to display the selected edition content using the selected application.

21. The system of claim 20, wherein the computing device identifier is further configured to:

select a web browser to display the selected edition content;

determine a web address of the original source for displaying the selected edition content, wherein the original source generates the selected edition content; and retrieve the selected edition content from the original source for display on the web browser of the receiving mobile device.

22. The system of claim 20, wherein the computing device identifier is further configured to:

select an edition player to display the selected edition content;

determine if the edition player is installed on the receiving mobile device;

in response to determining whether the edition player is installed on the receiving mobile device, access the selected edition content using the edition player; and in response to determining the edition player is not installed on the receiving mobile device, install the edition player on the receiving mobile device to display the selected edition content.

23. The system of claim 20, wherein the computing device identifier is further configured to:

select a magazine edition to display the selected edition content; and access the selected edition content using a data storage; and retrieve the selected edition content from the data storage for display on the web browser of the receiving mobile device.

24. The system of claim 18, wherein the computing device identifier is further configured to:

identify that the type of the computing device is a non-mobile device; and based on the identifying, select a web browser to display the selected edition content;

determine a web address of an original source for displaying the selected edition content, wherein the original source generates the selected edition content; and retrieve the selected edition content from the original source for display on the web browser of the non-mobile device.

25. The method of claim 1 further comprising:

routing the second mobile device to a different location provided by a publisher of the edition content based on the device identifier indicating that a format of the edition content is compatible with information stored at the different location.

26. The method of claim 6 further comprising:

routing the second mobile device to a different location provided by a publisher of the edition content based on the device identifier indicating that a format of the edition content is compatible with information stored at the different location.

27. The system of claim 13, wherein the generator is further configured to:

route the second mobile device to a different location provided by a publisher of the edition content based on the device identifier indicating that a format of the edition content is compatible with information stored at the different location.

28. The system of claim 18, wherein the selector is further configured to:

route the second mobile device to a different location provided by a publisher of the edition content based on the device identifier indicating that a format of the edition content is compatible with information stored at the different location.

* * * * *